J. T. BIGGS.
SUGAR CANE HARVESTER.
APPLICATION FILED DEC. 13, 1913.
1,101,393.
Patented June 23, 1914.
3 SHEETS—SHEET 3.
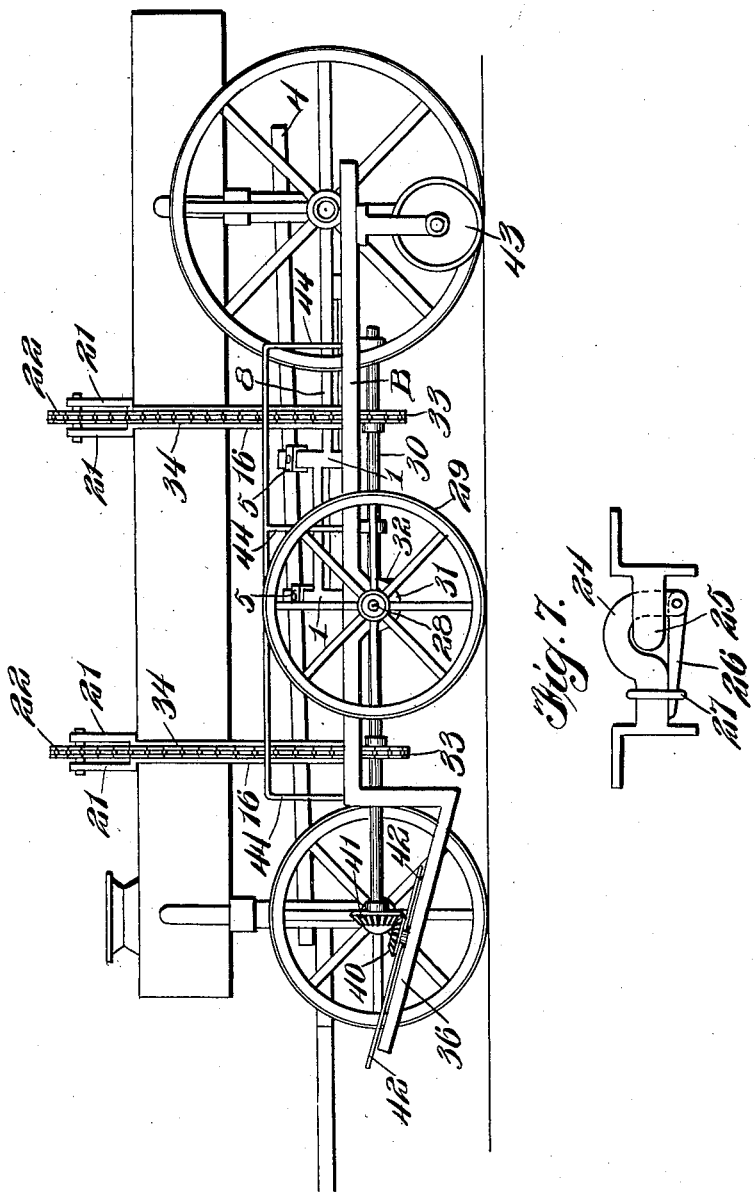
Witnesses
J. R. Heinrichs
N. Peacock
Inventor
Jesse T. Biggs
By Victor J. Evans
Attorney

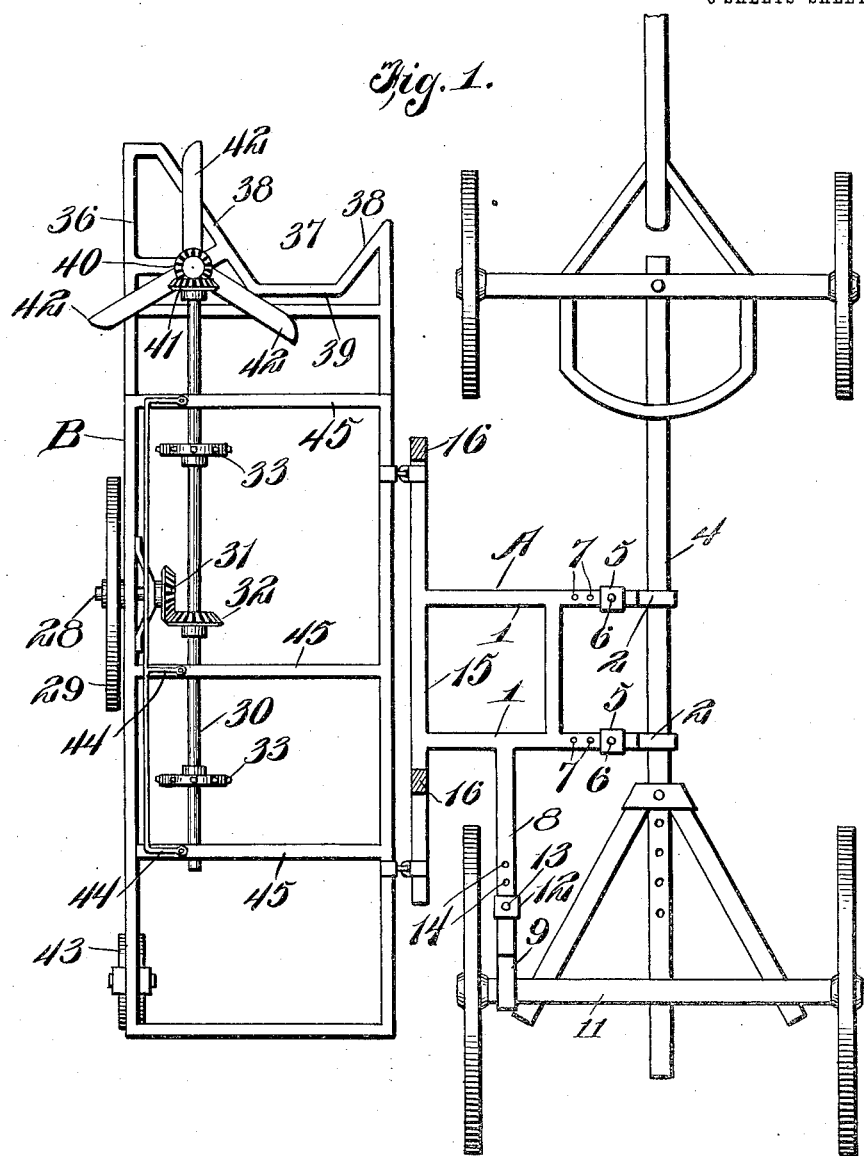

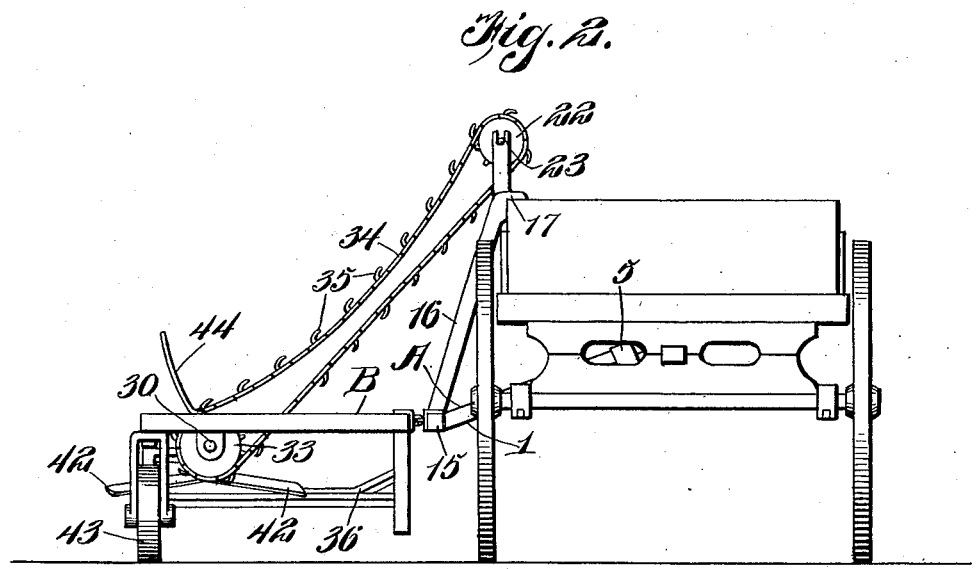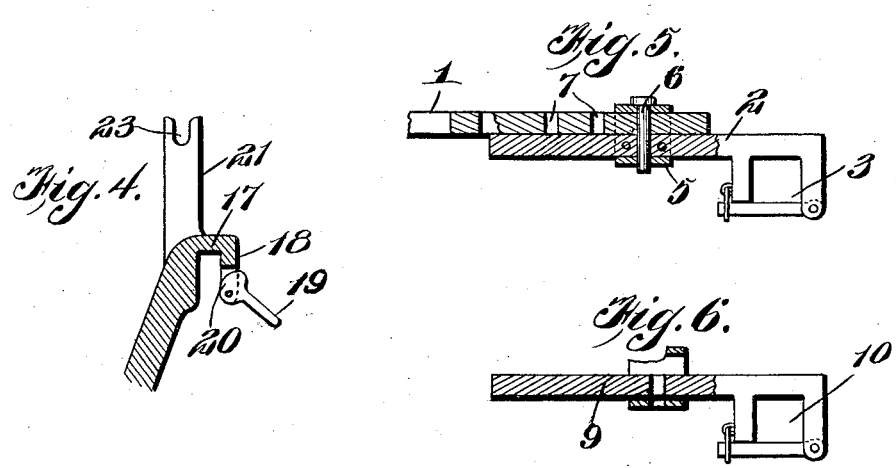

UNITED STATES PATENT OFFICE.

JESSE THOMAS BIGGS, OF CLEVELAND, OHIO.

SUGAR-CANE HARVESTER.

1,101,393.  Specification of Letters Patent.  Patented June 23, 1914.

Application filed December 13, 1913. Serial No. 806,579.

*To all whom it may concern:*

Be it known that I, JESSE T. BIGGS, a citizen of the United States, residing at Cleveland, in the county of Cuyahoga and State of Ohio, have invented new and useful Improvements in Sugar-Cane Harvesters, of which the following is a specification.

This invention relates to sugar cane harvesters and it consists in the novel features hereinafter described and claimed.

An object of the invention is to provide a harvester in the form of an attachment adapted to be applied to the running gear of a wagon whereby the same is moved along the row of stalks together with the wagon. The harvester is supported upon wheels and is provided with a series of rotating knives adapted to be operated from one of the supporting wheels. The stalks as they are cut by the said knives fall back upon the body of the attachment and the attachment is provided with an elevating device adapted to engage the stalks and carry the same up over the side boards of the wagon body and deposit the stalks into the said body.

In the accompanying drawings:—Figure 1 is a top plan view of the harvester showing the same applied to the running gear of a wagon. Fig. 2 is a rear end elevation of the harvester. Fig. 3 is a side elevation of the same. Figs. 4, 5, 6 and 7 are detailed views of the several features thereof As illustrated in the accompanying drawings the harvester comprises an inner frame A and an outer frame B. These frames are hingedly connected together as will be hereinafter described and the inner frame is adapted to be connected with the running gear of a wagon. The inner frame A comprises parallel bars 1 which are provided at their inner ends with adjustable sections 2 having clips 3 adapted to be secured to the reach pole 4 of the running gear of the wagon. The sections 2 are provided with sleeves 5 which receive the inner end portions of the bars 1 and pins 6 pass through the said sleeves and are adapted to pass through registering perforations 7 provided in the bars 1. Therefore it will be seen that the sections 2 may be shifted or adjusted with relation to the bars 1 so that the frame A may be elongated or contracted as desired. An arm 8 extends rearwardly from one of the bars 1 and is provided at its rear end portion with an adjustable portion 9 having at its rear end a clip 10 adapted to receive the end portion of the rear axle 11 of the running gear of the wagon. The said section 9 is also provided with a sleeve 12 and a pin 13 which is adapted to pass through any of the perforations 14 provided in the arm 8 and consequently the arm 8 and section 9 may be shifted with relation to each other in order that the inner frame A may properly sit upon the running gear of the wagon. A bar 15 is carried at the outer ends of the bars 1 and is disposed at a right angle with relation to the said bars 1.

Uprights 16 are mounted upon the bar 15 and are provided at their upper ends with shoulders 17 adapted to rest upon the upper edge of the side of the body of the wagon. The shoulders 17 are provided with downwardly disposed lugs 18 adapted to fit against the inner surface of the side of the wagon body and levers 19 are fulcrumed upon the lugs 18. The said levers 19 are provided with eccentric end portions 20 which when the levers are turned are adapted to bear against the inner surface of the side of the wagon body and securely hold or fix the uprights 16 with relation to the side of the wagon body. Upwardly disposed parallel arms 21 are mounted upon the shoulder 17 and sprocket wheels 22 are journaled for rotation between the arms 21. The upper ends of the arms 21 are slotted as at 23 and the shafts of the wheels 22 rest in the said slots consequently the sprocket wheels and their shafts may be readily lifted out of the slots and disconnected from the upper ends of the arms 21 when desired.

Hooks 24 (shown in enlarged detail in Fig. 7) are mounted upon the bar 15 in the vicinity of the ends thereof and engage eyes 25 mounted at the inner side of the frame B. If desired this arrangement of the hooks and eyes may be reversed. Tongues 26 are pivoted at the end portions of the bills of the hooks 24 and are adapted to be swung back against the shanks of the said hooks and rings 27 are slidably mounted upon the shanks of the said hooks and are adapted to be passed over the free end portions of the tongues 26 whereby the said tongues are held against swinging movement and the eyes 25 are prevented from disengaging the said hooks.

A shaft 28 is journaled for rotation at the intermediate portion of the frame B and a ground wheel 29 is fixed to one end portion of the shaft 28. A shaft 30 is journaled for rotation upon the frame B and is disposed at a right angle to the shaft 28. A gear wheel 31 is fixed to the shaft 28 and meshes with a gear wheel 32 fixed upon the shaft 30. Sprocket wheels 33 are fixed upon the shaft 30 and sprocket chains 34 are trained around the sprocket wheel 22 and 33. The sprocket chains 34 carry fingers 35. The frame B is provided at its forward end with a head 36 which is located below the upper surface of the body portion of the said frame. The head 36 is upwardly and forwardly inclined from the forward end of the frame B and the said head is provided with a stalk throat 37 having converging side bars 38 and a transversely disposed intermediate bar 39. A gear wheel 40 is journaled for rotation upon the head 36 and one of the side bars 38 thereof and meshes with a gear wheel 41 fixed to the forward end of the shaft 30. Blades 42 are fixed to the gear wheel 40 and are arranged to swing across the throat 37 provided in the head 36. The rear portion of the frame B is supported by a caster wheel 43 and inclined rods 44 are mounted upon the cross bars 45 of the frame B.

In operation as the wagon is moved along a row of stalks the frame A moves with the same and inasmuch as the wheel 29 runs upon the ground the shaft 28 is rotated. Through the intermeshing wheels 31 and 32 the shaft 30 is rotated and through the intermeshing wheels 41 and 40 the blades 42 are swung around the axis of the wheel 40 and move along the throat 37 of the head 36. As the frame B moves toward the stalks the stalks are received in the throat 37 of the head 36 and the blades 42 come in contact with the said stalks and cut the same. The blades 42 turn in a plane which is inclined with relation to a horizontal and consequently a shearing cut is imparted to the stalks and as the stalks are severed the upper portions thereof fall back over the frame B and lodge upon the chains 34 and against the inclined rods 44. In view of the fact that the shaft 30 is rotating the upper runs of the chains 34 and the fingers 35 carried by the said chains engage the stalks and said stalks are lifted or elevated over the upper edge of the body of the wagon and may fall from the chains and fingers into the body of the wagon. Consequently it will be seen that a simple and an effective means is provided for harvesting stalks and as the wagon moves over the ground any unevenness in the ground will permit the frame B to swing vertically with relation to the wagon running gear in view of the fact that the said frame is hingedly or pivotally connected with the frame A by means of the hooks 24 and eyes 25.

Having described the invention what is claimed is:

A stalk harvester comprising an inner frame having bars provided with adjustable sections, means carried by the sections for attachment to the reach pole of a wagon, an arm mounted upon one of the said bars, and adjustable sections mounted upon said arm, means carried by the last mentioned sections for connecting the same with the axle of a running gear, uprights mounted upon the said frame, means for connecting the uprights with the side board of the wagon body, wheels journaled at the upper ends of the uprights, an outer frame hingedly connected with the first mentioned frame, cutting blades mounted upon the outer frame, means for operating the cutting blades, an elevator extending from the outer frame over the wheels upon the said uprights, and means for operating the said elevator.

In testimony whereof I affix my signature in presence of two witnesses.

JESSE THOMAS BIGGS.

Witnesses:
 ANNA T. TRUHLAR,
 FRED F. TRUHLAR.

---

Copies of this patent may be obtained for five cents each, by addressing the "Commissioner of Patents, Washington, D. C."